(12) United States Patent
Nakanishi et al.

(10) Patent No.: US 10,106,203 B2
(45) Date of Patent: Oct. 23, 2018

(54) VEHICLE BODY STRUCTURE

(71) Applicant: HONDA MOTOR CO., LTD., Tokyo (JP)

(72) Inventors: Nobuyuki Nakanishi, Tokyo (JP); Akihisa Kudoh, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/227,616

(22) Filed: Aug. 3, 2016

(65) Prior Publication Data
US 2017/0057555 A1 Mar. 2, 2017

(30) Foreign Application Priority Data
Aug. 4, 2015 (JP) ................... 2015-154480

(51) Int. Cl.
*B62D 25/20* (2006.01)
*B62D 21/03* (2006.01)
*B62D 21/09* (2006.01)
*B62D 21/10* (2006.01)
(Continued)

(52) U.S. Cl.
CPC ......... *B62D 25/2036* (2013.01); *B62D 21/03* (2013.01); *B62D 21/08* (2013.01); *B62D 21/09* (2013.01); *B62D 21/10* (2013.01); *B62D 25/025* (2013.01); *B62D 25/2027* (2013.01)

(58) Field of Classification Search
CPC .... B62D 25/2036; B62D 21/02; B62D 21/03; B62D 21/08; B62D 21/10; B62D 25/025; B62D 25/2027
See application file for complete search history.

(56) References Cited

U.S. PATENT DOCUMENTS

2002/0067053 A1 6/2002 Wolkersdorfer et al.

FOREIGN PATENT DOCUMENTS

| JP | 3-8542 Y2 | 3/1991 | |
|---|---|---|---|
| JP | 2002193148 A * | 7/2002 | ............ B62D 21/10 |
| JP | 2009-107424 A | 5/2009 | |

(Continued)

OTHER PUBLICATIONS

Office Action dated Apr. 24, 2017, issued in counterpart Japanese Patent Application No. 2015-154480, with English translation. (8 pages).

(Continued)

*Primary Examiner* — D Glenn Dayoan
*Assistant Examiner* — Melissa A Black
(74) *Attorney, Agent, or Firm* — Westerman, Hattori, Daniels & Adrian, LLP (57) ABSTRACT

A body structure includes: a pair of side sills separated in the vehicle width direction; a front floor panel provided between the pair of side sills; a floor tunnel extending in the longitudinal direction of the vehicle body at the center in the vehicle width direction of the pair of side sills, and bulging upward from the front floor panel; and a cross member extending in the vehicle width direction at a rear end portion of the floor tunnel, and is characterized in that: the cross member includes a vertical wall extending upward with respect to the front floor panel; and the vertical wall extends continuously in the vehicle width direction between the pair of side sills, is joined to the rear end portion of the floor tunnel, and closes an opening of the rear end portion.

10 Claims, 4 Drawing Sheets

(51) Int. Cl.
*B62D 21/08* (2006.01)
*B62D 25/02* (2006.01)

(56) References Cited

FOREIGN PATENT DOCUMENTS

| JP | 2013-163470 A | 8/2013 |
| JP | 2013-199172 A | 10/2013 |
| JP | 2014-043133 A | 3/2014 |

OTHER PUBLICATIONS

Office Action dated Mar. 9, 2018, issued in counterpart Chinese Application No. 201610630051.1. (6 pages).

\* cited by examiner

VEHICLE BODY STRUCTURE

TECHNICAL FIELD

The present invention relates to a vehicle body structure.

CROSS-REFERENCE OF RELATED APPLICATION

This application claims priority of Japanese Patent Application No. 2015-154480 filed in Japan on Aug. 4, 2015, the entire contents of which are incorporated herein by reference.

BACKGROUND OF THE INVENTION

As a floor structure of a vehicle body, a structure (Japanese Examined Utility Model Registration Application Publication No. Hei 3-8542, for example) has been known in which a longitudinally extending floor tunnel is provided. The floor tunnel not only forms space for arranging a configuration extending in the longitudinal direction of the vehicle body such as a fuel pipe and an exhaust pipe, but also improves stiffness of the floor.

Due to its sectional shape, a floor tunnel may not be sufficiently stiff to withstand load in the direction of opening and closing its right and left side walls to the right and left. Hence, sometimes vertical vibration of right and left floors of the floor tunnel cannot be suppressed sufficiently, or there may be drawbacks in load distribution at the time of a side crash, for example. Although a brace connecting bottom parts of right and left floor panels may be provided to pass through a lower part of the floor tunnel as a countermeasure, this causes increase in the number of parts and in the weight of the vehicle body.

SUMMARY OF THE INVENTION

An objective of the present invention is to improve stiffness of a floor around a floor tunnel, while suppressing increase in the number of parts and in the weight of the vehicle body.

According to the present invention, there is provided a body structure including:

a pair of side sills separated in the vehicle width direction;

a front floor panel provided between the pair of side sills;

a floor tunnel extending in the longitudinal direction (a vehicle rear-front direction) of the vehicle body substantially at the middle or at the center in the vehicle width direction of the pair of side sills, and bulging upward from the front floor panel; and a cross member extending in the vehicle width direction at a rear end portion (a rear end opening) of the floor tunnel, characterized in that:

the cross member includes a vertical wall extending upward with respect to the front floor panel; and the vertical wall extends continuously in the vehicle width direction between the pair of side sills, is joined to the rear end portion of the floor tunnel, and closes an opening of the rear end portion.

According to the present invention, stiffness of a floor around a floor tunnel can be improved, while suppressing increase in the number of parts and in the weight of the vehicle body.

DETAILED DESCRIPTION OF THE INVENTION

Hereinafter, a body structure of an embodiment of the present invention will be described. In the drawings, arrow FR indicates the longitudinal direction of the vehicle body (vehicle), FT indicates the front, and RR indicates the rear. Arrow W indicates the vehicle width direction, and when viewed in the forward traveling direction of the vehicle, LT indicates the left, and RT indicates the right. Arrow H indicates the vertical direction, UR indicates the upper side, and LR indicates the lower side.

Figure 1:
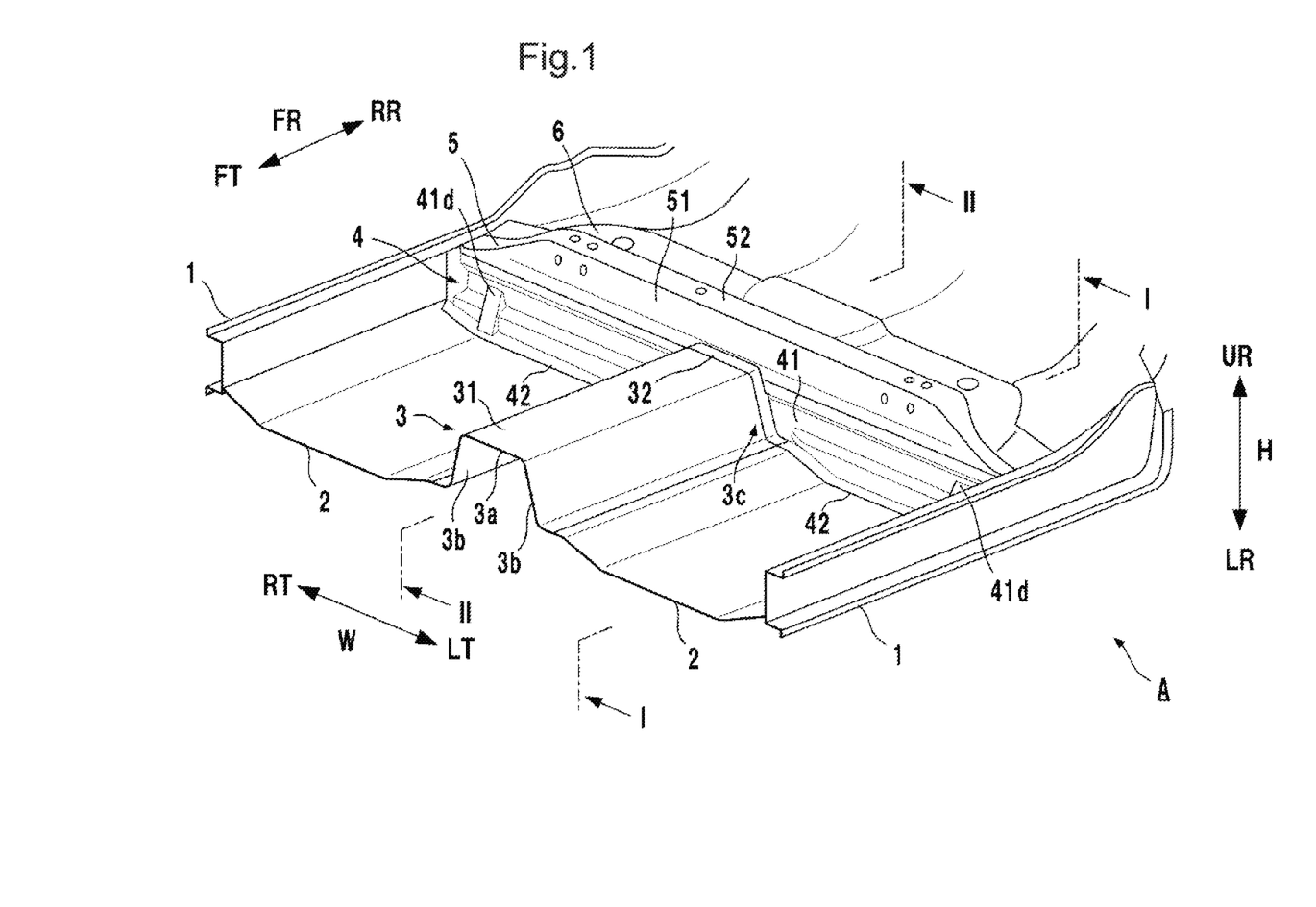
FIG. 1 is a perspective view of a body structure, according to an embodiment of the present invention.

FIG. 1 is a perspective view of a body structure A of an embodiment of the present invention. The body structure A is a floor structure around a back seat of a vehicle, and includes a pair of side sills 1, a front floor panel 2, a floor tunnel 3, a cross member 4, a seat attachment member 5, and a rear floor panel 6.

The pair of side sills 1 are separated in the vehicle width direction. Each of the right and left side sills 1 extends in the longitudinal direction of the vehicle body. The front floor panel 2 is a member constituting a bottom part of the body at the foot of the back seat, is provided between the pair of side sills 1, and the side sills 1 are joined thereto. The side sill 1 extends in the longitudinal direction of the vehicle body in an outer edge portion in the vehicle width direction of the front floor panel 2.

The floor tunnel 3 is a center tunnel extending in the longitudinal direction of the vehicle body, at the center in the vehicle width direction of the pair of side sills 1. The floor tunnel 3 bulges upward in a protruding manner from the front floor panel 2, includes an upper wall 3a and right and left side walls 3b, and is formed into a shape opened downward and having a trapezoidal section. The floor tunnel 3 may be formed integrally with the front floor panel 2, or may be formed by joining a separate member. The embodiment exemplifies a case in which a separate member is joined to form the floor tunnel.

Although the floor tunnel 3 of the embodiment is configured of two members, which are a main body portion 31 and a joint portion 32, it may be configured of a single member. The main body portion 31 is a member constituting the whole floor tunnel 3, and the joint portion 32 is a member for joining the floor tunnel 3 to the cross member 4 and the seat attachment member 5. The joint portion 32 constitutes a rear end portion 3c of the floor tunnel 3.

The cross member 4 is a member extending in the vehicle width direction at the rear end portion 3c of the floor tunnel 3, and both end parts thereof are joined to the pair of side sills 1. The rear floor panel 6 is a member constituting a bottom part of the body in a rear part of the vehicle (e.g. from the back seat to the storage compartment), and extends rearward in the longitudinal direction of the vehicle body from an upper part of the cross member 4. The seat attachment member 5 is a member for supporting the back seat, and extends in the vehicle width direction, while also extending rearward in the longitudinal direction of the vehicle body from an upper part of the cross member 4. The seat attachment member 5 is arranged above the rear floor panel 6.

Figure 2:
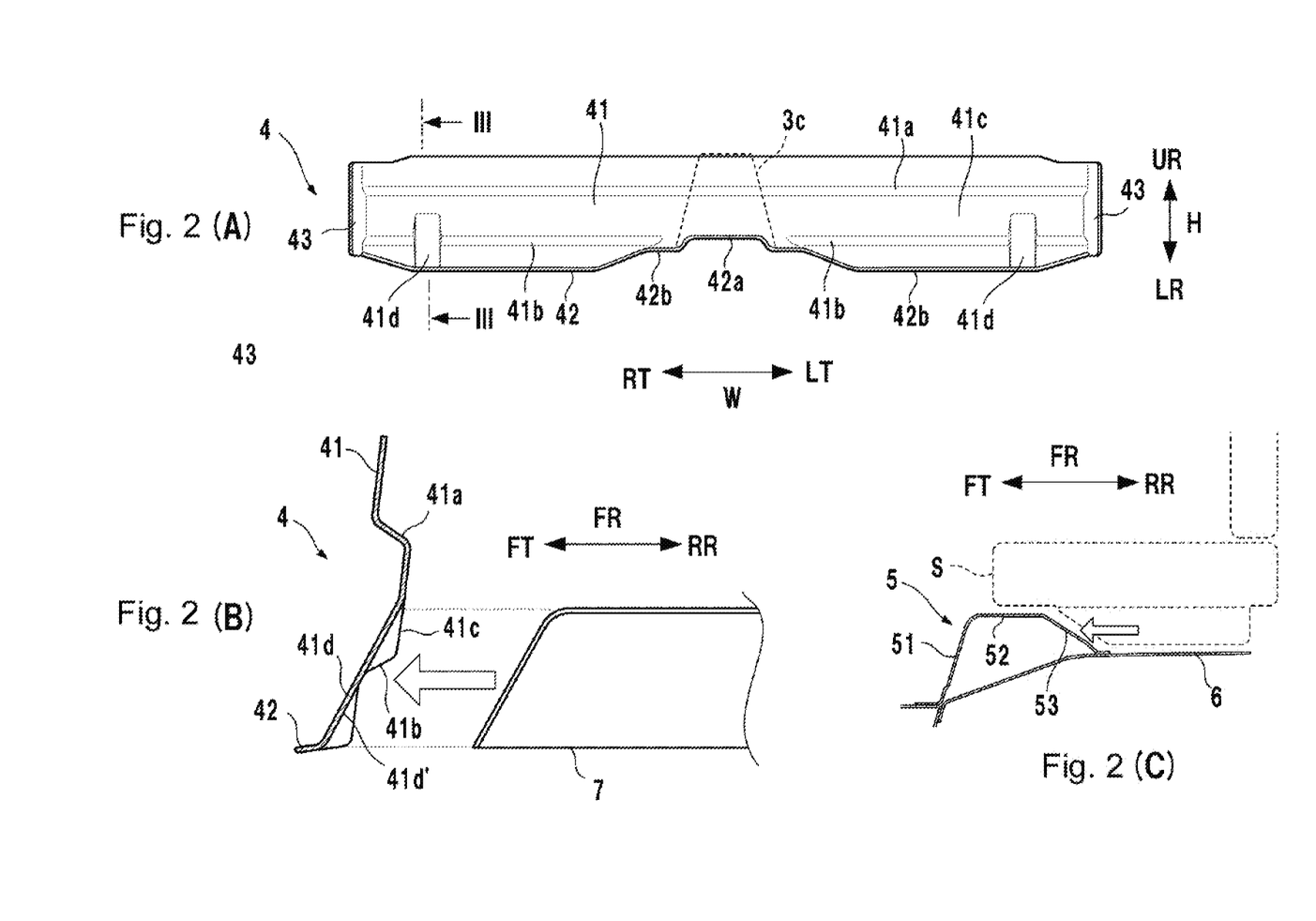
FIG. 2A is a front view of a cross member.
FIG. 2B is a cross-sectional view taken along line III-III of FIG. 2A.
FIG. 2C is a diagram showing an example of how movement of a seat is suppressed.
Figure 3:
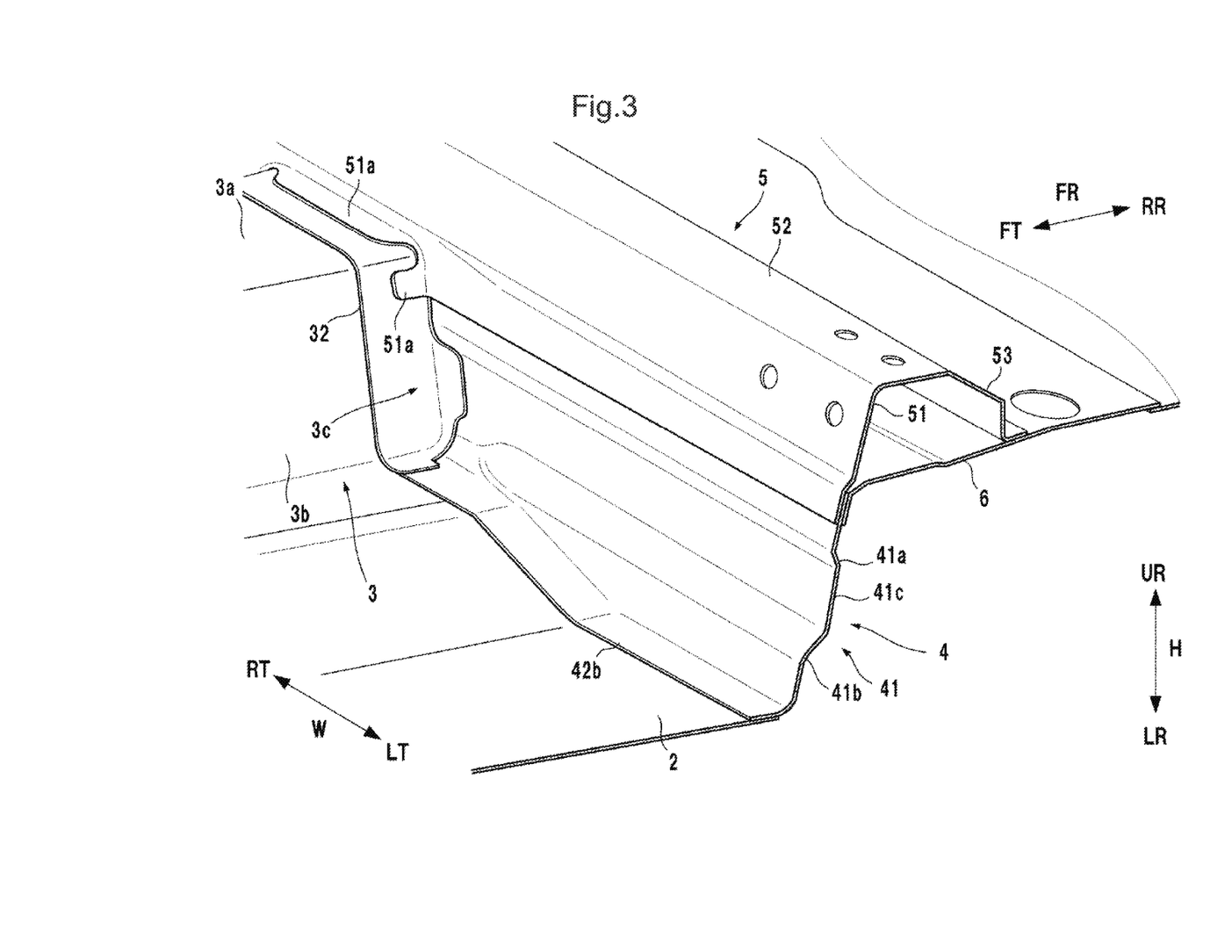
FIG. 3 is a cross-sectional view taken along line I-I of FIG. 1.
Figure 4:
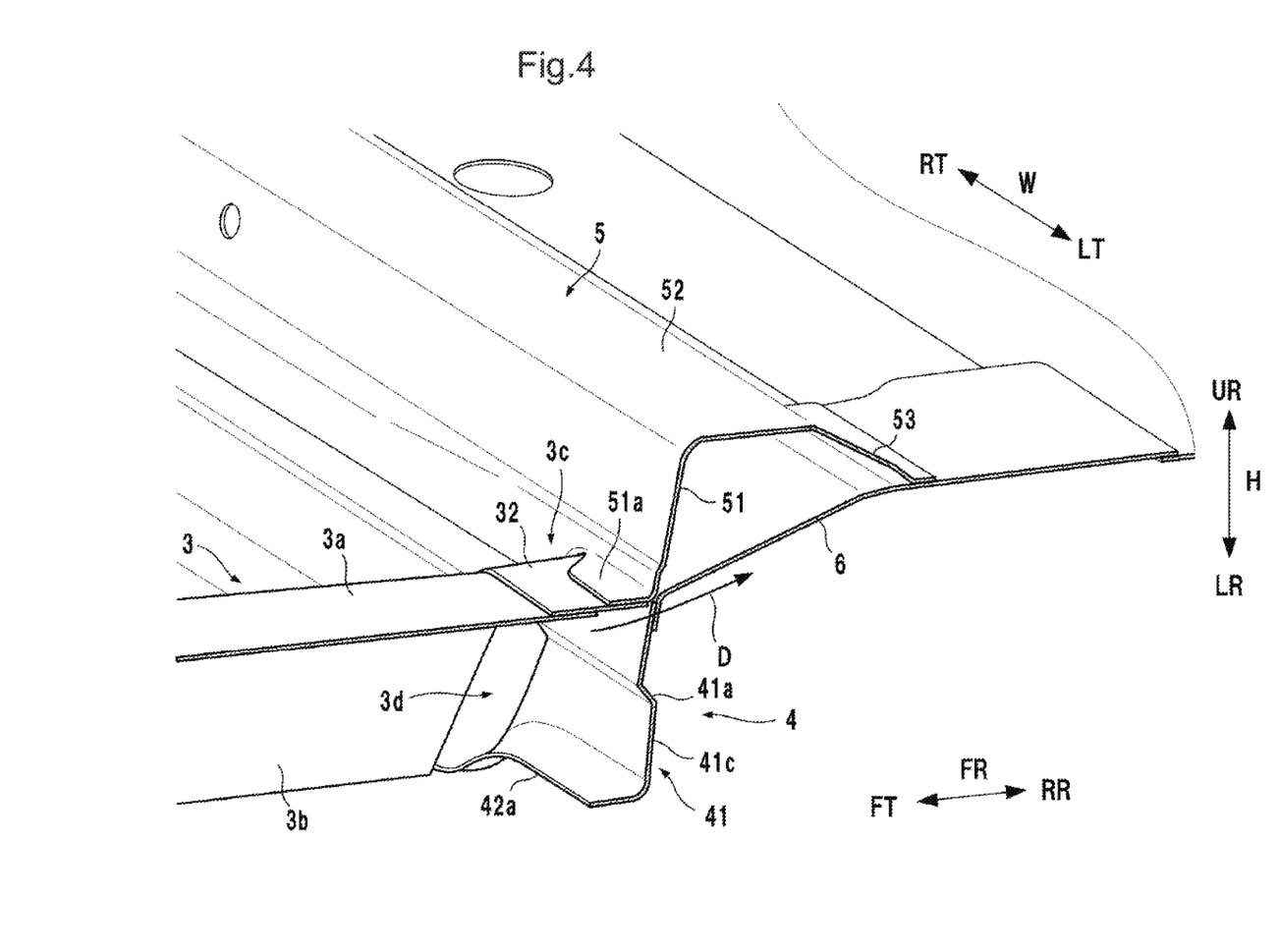
FIG. 4 is a cross-sectional view taken along line II-II of FIG. 1.

The body structure A will be further described by referring to part (A) of FIG. 2, and FIGS. 3 and 4, in addition to FIG. 1. Part (A) of FIG. 2 is a front view of the cross member 4, FIG. 3 is a cross-sectional view taken along line I-I of FIG. 1, and FIG. 4 is a cross-sectional view taken along line II-II of FIG. 1. FIG. 4 shows a cross-section structure of the floor tunnel 3 at the center thereof.

The cross member 4 includes, as one body, a vertical wall 41, a flange portion 42, and a pair of side walls 43. The vertical wall 41 is a plate shaped member as a whole. The vertical wall 41 extends upward with respect to the front floor panel 2, and extends continuously in the vehicle width direction between the pair of side sills 1. A left end part of the vertical wall 41 is joined to the left side sill 1, and the right end part is joined to the right side sill 1. The pair of side walls 43 extend frontward in the longitudinal direction of the vehicle body from both end parts in the vehicle width direction of the vertical wall 41, and are used for joining the vertical wall 41 and the side sills 1.

Since the cross member 4 (particularly the vertical wall 41) thus extends continuously in the vehicle width direction between the pair of side sills 1, load at the time of a side crash can be transmitted from one side sill 1 to the other side sill 1, so that side collision performance can be improved.

The vertical wall 41 extends in the vehicle width direction, and has curved portions 41a and 41b, which are formed by curving the vertical wall 41 in the longitudinal direction of the vehicle body. The curved portion 41a is positioned on the upper side, and the curved portion 41b is positioned on the lower side. The curved portion 41a is formed continuously in the vehicle width direction between the pair of side sills 1, while the curved portion 41b is interrupted at the center in the vehicle width direction.

The curved portion 41a is curved in a two-stepped manner, where the vertical wall 41 is curved rearward, and then curved downward. The curved portion 41b is also curved in a two-stepped manner, where the vertical wall 41 is curved frontward, and then curved downward. The vertical wall 41 has a rearward recess 41c formed of the curved portion 41a and the curved portion 41b.

Since the vertical wall 41 of the embodiment has the curved portions 41a and 41b, stiffness thereof can be improved as compared to forming the vertical wall 41 flat, and particularly, since the edge or ridge lines (bending lines) of the curved portions 41a and 41b are oriented in the vehicle width direction, stiffness of the vertical wall 41 in the vehicle width direction can be improved. Hence, load can be transmitted more effectively through the vertical wall 41 in the vehicle width direction, and side collision performance can be improved. In particular, the edge line of the curved portion 41a extends continuously in the vehicle width direction between the pair of side sills 1, and even though the curved portion 41b is interrupted at the center in the vehicle width direction, the floor tunnel 3 is joined thereto to improve stiffness. Accordingly, load can be transmitted even more effectively between the pair of side sills 1. Note that although multiple curved portions 41a and 41b are provided in the embodiment, a single curved portion may be provided instead.

The vertical wall 41 has a box-shaped frontward recess 41d on both end parts thereof in the vehicle width direction. Part (B) of FIG. 2 is a cross-sectional view taken along line III-III of part (A) of FIG. 2, and shows the sectional shape of the recess 41d. A rear surface of the recess 41d forms a flat surface 41d'. A rear frame 7 can be joined to the rear side of the flat surface 41d' (a flat rear side surface). The rear frame 7 supports a suspension device of a rear wheel, for example. The rear frame 7 has side frames separated in the vehicle width direction, and the tip end of each side frame can be joined to the closed end surface 41d'. The rear frame 7 of part (B) in FIG. 2 shows an example of a tip end part of the side frame.

By forming the curved portions 41a and 41b, an uneven part, i.e., the flat surface 41d' is formed on the rear surface of the vertical wall 41, so that the rear frame 7 can be joined easily. Not only is the recess 41d itself formed into a box shape to improve stiffness, but also the recess is formed to interrupt the curved portion 41b, so that stiffness is improved by the adjacent curved portion 41b. Accordingly, stiffness for supporting the rear frame 7 can be improved.

Next, the entire vertical wall 41 or cross member 4 can be configured by forming a single plate material (e.g. steel plate) by pressing, for example. This configuration can reduce weight, as compared to a configuration in which the entire vertical wall 41 or cross member 4 is formed of multiple plate materials. Also, dedicated space for the vertical wall 41 can be eliminated, whereby space for arranging peripheral configurations can be enlarged, or space for the occupant's feet can be enlarged. An example of space for arranging peripheral configurations is a space below the rear floor panel 6, and this space can be enlarged. A fuel tank can be installed in the space below the rear floor panel 6, for example, and by enlarging this space, a fuel tank having a larger volume can be installed.

As can be seen from FIGS. 1 and 3, the vertical wall 41 is joined to the rear end portion 3c of the floor tunnel 3 by the joint portion 32. In addition, the vertical wall 41 has a center part that closes an opening 3d of the rear end portion 3c. In part (A) of FIG. 2, the broken line indicates a part where the rear end portion 3c is joined, and FIG. 4 shows how the vertical wall 41 closes the opening 3d of the rear end portion 3c.

Since the vertical wall 41 closes the opening 3d of the rear end portion 3c, stiffness to withstand load in the direction of opening and closing the right and left side walls 3b of the floor tunnel 3 to the right and left can be improved. Also, since the cross member 4 is used to close the opening 3d of the floor tunnel 3, stiffness of the floor around the floor tunnel 3 can be improved while suppressing increase in the number of parts and in the weight of the vehicle body. Note that although a larger area of the vertical wall 41 for closing the opening 3d is advantageous in terms of improvement in stiffness, the vertical wall does not necessarily have to close the entire opening 3d, as long as it extends to straddle the right and left side walls 3b.

The flange portion 42 protrudes frontward in the longitudinal direction of the vehicle body from a lower part of the vertical wall 41, and is positioned at the lower end of the cross member 4. The flange portion 42 includes a center portion 42a and a peripheral portion 42b, and the peripheral portion 42b is joined to the front floor panel 2. Load can be transmitted more effectively between the front floor panel 2 and the cross member 4 through the flange portion 42, and vertical vibration of the front floor panel 2 can be suppressed to improve comfort in riding. Also, the flange portion 42 extends continuously in the vehicle width direction between the pair of side sills 1. The corner between the vertical wall 41 and the flange portion 42 is where stiffness in the vehicle width direction is increased, and since this corner extends between the pair of side sills 1, load can be transmitted more effectively between the pair of side sills 1, and side collision performance can be improved.

The center portion 42a (a middle lower edge) is a part that crosses the rear end portion 3c of the floor tunnel 3, and is positioned higher than the peripheral portion 42b (side lower edges). Hence, a gap can be formed below the center portion 42a, and by utilizing this gap, a fuel pipe, exhaust pipe, or other parts can be inserted easily into the floor tunnel 3. While the embodiment aims to improve stiffness by closing the rear end portion 3c of the floor tunnel 3 with the vertical wall 41c, forming a gap below the center portion 42a allows relatively small diameter piping to be laid out in the longitudinal direction inside the floor tunnel 3.

Next, the rear floor panel 6 is provided such that it is continuous with the upper wall 3a of the floor tunnel 3, as indicated by arrow D in FIG. 4. To be more specific, the front end of the rear floor panel 6 is positioned at the same height as the upper wall 3a, and extends rearward from this front end. Since the rear floor panel 6 is arranged substantially flush with the upper wall 3a with no steps therebetween, load can be transmitted more effectively from the floor tunnel 3 to the rear floor panel 6, and the occupant's comfort in riding can be improved. Also, load distribution from the rear floor panel 6 to the floor tunnel 3 can be prompted.

The seat attachment member 5 is a plate shaped member extending in the vehicle width direction above the rear floor panel 6, and bulges upward in a protruding manner from the rear floor panel 6, to form a closed section with the rear floor panel 6. The seat attachment member 5 includes a front wall 51, an upper wall 52, and a rear wall 53, which are continuous in the longitudinal direction of the vehicle body. A flange portion 51a is provided in the front wall 51, and is joined to the floor tunnel 3 (joint portion 32).

Also, as shown in FIG. 3, the front wall 51 has a lower part joined to an upper part of the vertical wall 41 of the cross member 4, and extends upward from the upper part of the vertical wall 41. Since the seat attachment member 5 is joined to the vertical wall 41, stiffness of seat attachment can be improved, so that the occupant's comfort in riding can be improved. Additionally, load can be distributed from the cross member 4 to the front wall 51, and the occupant's comfort in riding can be improved even more.

The rear wall 53 is tilted downward toward the rear in the longitudinal direction of the vehicle body, and joined to the rear floor panel 6. Since a step is formed between the rear floor panel 6 and the upper wall 52, if a back seat S is installed as illustrated schematically in part (C) of FIG. 2, for example, the rear wall 53 forms an inclined surface that keeps the seat S from moving frontward. Hence, frontward movement of the seat S above the seat attachment member 5 can be suppressed, at the time of a frontal crash or other timings, for example.

Summary of Embodiment

1. The body structure (such as A) of the above embodiment includes:
   a pair of side sills (such as 1) separated in the vehicle width direction;
   a front floor panel (such as 2) provided between the pair of side sills;
   a floor tunnel (such as 3) extending in the longitudinal direction of the vehicle body at the center in the vehicle width direction of the pair of side sills, and bulging upward from the front floor panel; and
   a cross member (such as 4) extending in the vehicle width direction at a rear end portion (such as 3c) of the floor tunnel, and is characterized in that:
   the cross member includes a vertical wall (such as 41) extending upward with respect to the front floor panel; and
   the vertical wall extends continuously in the vehicle width direction between the pair of side sills, is joined to the rear end portion of the floor tunnel, and closes an opening of the rear end portion.

According to this configuration, since the vertical wall closes the opening of the rear end portion, stiffness to withstand load in the direction of opening and closing the right and left side walls of the floor tunnel to the right and left can be improved. Also, since the cross member is used to close the opening of the floor tunnel, stiffness of the floor around the floor tunnel can be improved while suppressing increase in the number of parts and in the weight of the vehicle body. Additionally, since the cross member extends continuously in the vehicle width direction between the pair of side sills, load at the time of a side crash can be transmitted from one side sill to the other side sill, so that side collision performance can be improved. Note that the vertical wall may close the entire opening of the rear end portion, or, as long as it straddles the right and left side walls of the floor tunnel, it may close only a part of the opening. If the vertical wall closes only a part of the opening, it may close the upper half of the opening or more, and may leave an open part on the lower side.

2. The body structure (such as A) of the above embodiment is characterized in that
   the vertical wall is configured of a single plate material.

According to this configuration, weight can be reduced as compared to a configuration in which the vertical wall is formed of multiple plate materials. Also, dedicated space for the vertical wall can be eliminated, whereby space for arranging peripheral configurations (such as a fuel tank) can be enlarged, and space for the occupant's feet can be enlarged.

3. The body structure (such as A) of the above embodiment is characterized in that:
   the cross member has a flange portion (such as 42) protruding frontward in the longitudinal direction of the vehicle body from a lower part of the vertical wall; and
   the flange portion is joined to the front floor panel.

According to this configuration, load can be transmitted more effectively between the front floor panel and the cross member through the flange portion, so that comfort in riding can be improved.

4. The body structure (such as A) of the above embodiment is characterized in that
   the flange portion extends continuously in the vehicle width direction between the pair of side sills.

According to this configuration, the corner between the vertical wall and the flange portion is where stiffness in the vehicle width direction is increased, and since this corner extends between the pair of side sills, load can be transmitted more effectively between the pair of side sills, and side collision performance can be improved.

5. the body structure (such as A) of the above embodiment is characterized in that
   the vertical wall has a curved portion (such as 41a and 41b) extending in the vehicle width direction, and formed by curving the vertical wall in the longitudinal direction of the vehicle body.

According to this configuration, the curved portion is where stiffness in the vehicle width direction is increased, and since this curved portion extends in the vehicle width direction, load can be transmitted more effectively through the vertical wall in the vehicle width direction, and side collision performance can be improved.

6. The body structure (such as A) of the above embodiment further includes a rear frame (such as 7) joined to the cross member, and is characterized in that the vertical wall has a flat surface (such as 41d'), which is formed on each of rear surfaces of both end parts thereof in the vehicle width direction, and to which the rear frame is joined.

According to this configuration, the rear frame can be joined easily to the cross member.

7. The body structure (such as A) of the above embodiment is characterized in that of the lower end of the cross member, a part (such as 42a) that crosses the rear end portion of the floor tunnel is positioned higher than other parts (such as 42b).

According to this configuration, a fuel pipe, exhaust pipe, or other parts can be inserted easily into the floor tunnel.

8. The body structure (such as A) of the above embodiment further includes a rear floor panel (such as 6) extending rearward in the longitudinal direction of the vehicle body from the cross member, and is characterized in that the rear floor panel is provided such that it is continuous with an upper wall (such as 3a) of the floor tunnel.

According to this configuration, load can be transmitted more effectively from the floor tunnel to the rear floor panel, so that the occupant's comfort in riding can be improved.

9. The body structure (such as A) of the above embodiment further includes a seat attachment member (such as 5) extending in the vehicle width direction above the rear floor panel, and bulging upward from the rear floor panel, and is characterized in that the seat attachment member is joined to the vertical wall, and includes an upward extending front wall (such as 51).

According to this configuration, since the seat attachment member is joined to the vertical wall, stiffness of seat attachment can be improved, so that the occupant's comfort in riding can be improved. Additionally, load can be distributed from the cross member to the front wall, and the occupant's comfort in riding can be improved even more.

10. The body structure (such as A) of the above embodiment is characterized in that:

the seat attachment member includes a rear wall (such as 53); and the rear wall is tilted downward toward the rear in the longitudinal direction of the vehicle body, and joined to the rear floor panel.

According to this configuration, frontward movement of a seat above the seat attachment member can be suppressed, at the time of a frontal crash or other timings.

DESCRIPTION OF REFERENCE NUMERALS

A body structure, 1 side sill, 2 front floor panel, 3 floor tunnel, 4 cross member, 41 vertical wall

The invention claimed is:
1. A vehicle body structure comprising:
a pair of side sills extending in a vehicle rear-front direction of a vehicle body and provided at positions away from each other in a vehicle width direction of the vehicle body;
a front floor panel provided between said pair of side sills;
a floor tunnel formed on the front floor panel and extending in the vehicle rear-front direction at a middle of the vehicle width direction, the floor tunnel bulging upward from said front floor panel and having a rear end opening opened in the vehicle rear-front direction; and
a cross member extending in the vehicle width direction between said pair of side sills, thereby bridging said pair of side sills, across a position adjacent to the rear end opening of said floor tunnel, wherein
said cross member has a vertical wall extending upward at a side of said front floor panel, said vertical wall extending continuously in the vehicle width direction between said pair of side sills and joined to said rear end opening of said floor tunnel at the middle in the vehicle rear-front direction, thereby closing the rear end opening.

2. The vehicle body structure according to claim 1, wherein
said vertical wall is configured of a single plate material.

3. The vehicle body structure according to claim 1, wherein
said cross member has a flange portion protruding from a lower part of said vertical wall frontward in the vehicle rear-front direction; and
said flange portion is joined to said front floor panel.

4. The vehicle body structure according to claim 3, wherein
said flange portion of the cross member extends continuously in the vehicle width direction between said pair of side sills.

5. The vehicle body structure according to claim 1, wherein
said vertical wall of the cross member has a curved portion which forms a ridge extending in the vehicle width direction, the curved portion being formed by curving said vertical wall in the vehicle rear-front direction.

6. The vehicle body structure according to claim 1, further comprising:
a rear frame joined to said cross member, wherein
said vertical wall of the cross member has a flat rear side surface in a vicinity of each side end thereof in the vehicle width direction, said rear frame being joined to the flat rear side surface.

7. The vehicle body structure according to claim 1, wherein
the cross member has a lower edge extending in the vehicle width direction which includes a middle lower edge that crosses the position adjacent to said rear end opening of said floor tunnel and side lower edges extending from the middle lower edge, the middle lower edge being positioned higher than the side lower edges.

8. The vehicle body structure according to claim 1, further comprising:
a rear floor panel extending rearward in the vehicle rear-front direction of the vehicle body from said cross member, wherein
said rear floor panel is provided such that it is at height continuous with an upper wall of said floor tunnel.

9. The vehicle body structure according to claim 8, further comprising:
a seat attachment member provided above said rear floor panel in a manner that extends in the vehicle width direction and bulges upward from said rear floor panel, wherein said seat attachment member has an upward extending front wall which is joined to said vertical wall of the cross member.

10. The vehicle body structure according to claim 9, wherein said seat attachment member has a rear wall which is tilted downward toward a rear side in the vehicle rear-front direction and joined to said rear floor panel.

\* \* \* \* \*